Dec. 1, 1959　　ALBRECHT-WOLF MANTZEL ET AL　　2,915,100

RESILIENT WHEEL

Filed Jan. 24, 1956　　　　　　　　　　　　　　　3 Sheets-Sheet 1

Inventors
ALBRECHT-WOLF MANTZEL
HANS DEURING
by
Attys.

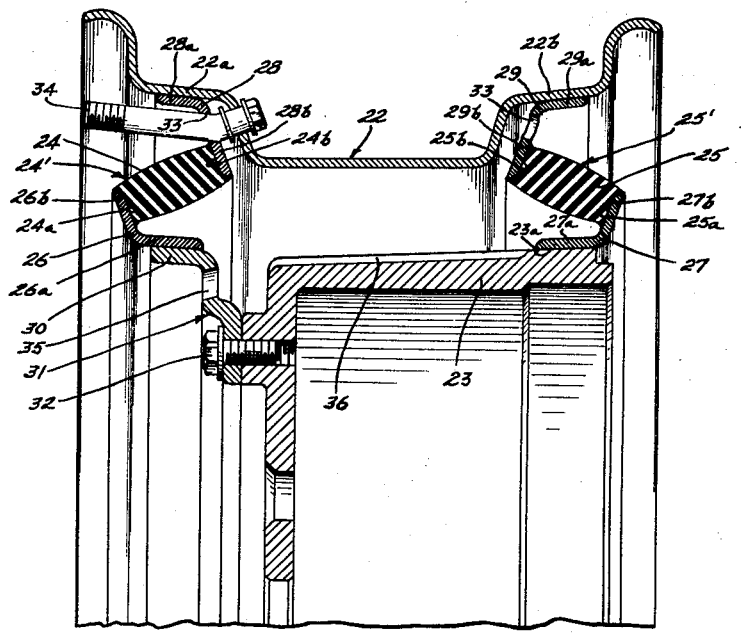
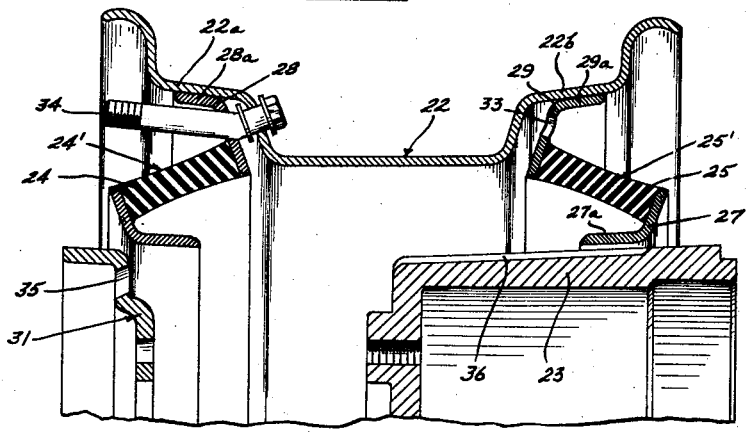

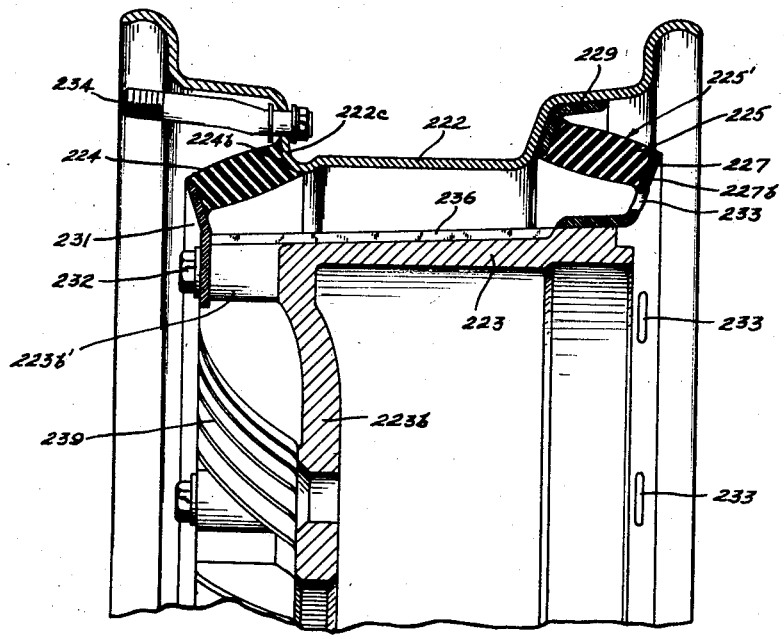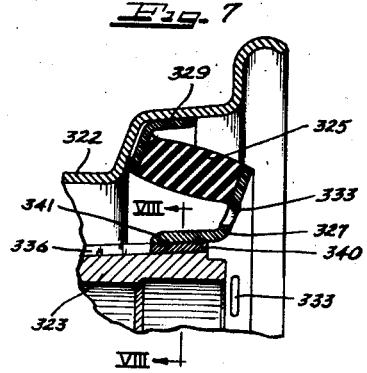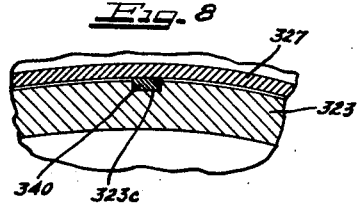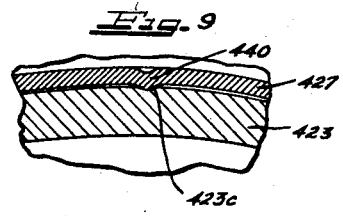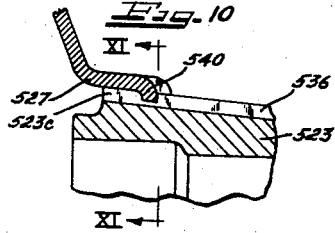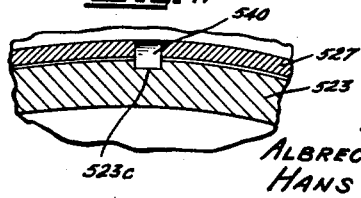

United States Patent Office 2,915,100
Patented Dec. 1, 1959

2,915,100

RESILIENT WHEEL

Albrecht-Wolf Mantzel, Stuttgart, Mohringen, and Hans Deuring, Burscheid, near Koln, Germany, assignors, by mesne assignments, to Rand-Goetze Corporation, Cleveland, Ohio, a corporation of Ohio Application January 24, 1956, Serial No. 561,070

6 Claims. (Cl. 152—49)

This invention relates to wheels, as for vehicles, and more particularly relates to resilient-type wheels in which a tire and rim are resiliently mounted on the associated wheel hub.

It is an object of the present invention to provide novel means for resiliently mounting a wheel rim and tire on a wheel hub, and to provide a resilient type wheel mounting which is adapted to be readily assembled.

Another object is to provide new and improved means providing for lateral stability of a resiliently mounted tire and rim.

A further object is to provide a novel resilient tire and rim mounting employing resiliently compressible material pre-compressed in assembly to provide a forced wedging holding of the rim to the hub through the resiliently compressible material.

Another object is to provide novel cooling means for a resilient wheel assembly.

A further object is to provide novel means resisting relative rotation about a wheel hub of a resiliently carried wheel rim and tire.

Another object is to provide sufficiently high precompression of the resilient mounting means of such a device that no tensile stresses can occur therein even under severe conditions of deflection and deformation of the assembly.

These and other objects, features, and advantages of the present invention will be readily apparent from the following description of exemplary preferred embodiments thereof, taken in conjunction with the accompanying drawings, in which:

Figure 2 is an axial cross-section of such a wheel, the section being taken generally along the line II—II of Figure 1;

Figure 3 is an axial cross-sectional view similar to Figure 2, but showing the parts in an intermediate stage of assembly;

Figure 6 is an axial cross-section through the wheel illustrated in Figure 5, the section being taken generally along the line VI—VI of Figure 5;

Figure 7 is a fragmentary axial cross-sectional view of a wheel, and illustrating means resisting relative rotation of the resiliently mounted elements;

Figure 8 is a cross-sectional view taken generally along the line VIII—VIII of Figure 7;

Figure 9 is a cross-sectional view similar to Figure 8, but illustrating alternative construction for resisting relative rotation of the resiliently mounted elements;

Figure 10 is a fragmentary axial cross-section through a wheel illustrating alternative means resisting relative rotation of the resisting mounted elements; and Figure 11 is a fragmentary cross-sectional view taken generally along the line XI—XI of Figure 10.

Figure 1:
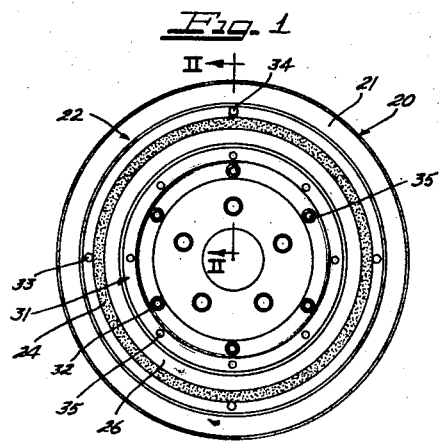
Figure 1 is a side elevational view of a wheel assembly embodying the present invention according to one embodiment thereof.

As shown in the drawings, the wheel 20 generally comprises a tire 21 mounted on a rim 22, the rim 22 being mounted to the wheel hub 23 in a novel resilient manner now to be described.

In the embodiment illustrated in Figures 1, 2, and 3, the resilient mounting of tire and rim assembly 21—22 is effected through the medium of an axially outward supporting structure 24' and an axially inward supporting structure 25'. These are respectively adapted to support the axially outer and axially inner portions of the rim 22 to the hub 23, and respectively include a resilient ring-like member 24—25. Desirably, the resilient ring members 24 and 25 are each provided from rubber or suitable rubber like material formed generally in the shape of the frustrum of a cone.

Supportingly associated with each of the resilient rings 24 and 25 respectively are generally ring-like radially outer supporting members 28—29 and generally ring-like radially inner supporting members 26—27. Each of the radially inner supporting members 26 and 27 is shown as desirably formed from heavy gauge metal into a general frusto-conical shape having an inner rim portion 26a—27a, respectively, tapering slightly inwardly of the wheel and slightly out of parallel with the wheel axis, and an outer rim portion 26b—27b radially outwardly extending at a substantially greater angle with respect to the wheel axis than do the rims 26a—27a. The radially inner end faces 24a—25a of the resilient members 24 and 25 are vulcanized to the rim-portions 26b and 27b respectively of the ring members 26 and 27.

The radially outer supporting ring members 28 and 29 are desirably identical, and comprise generally frusto-conically shaped ring members having outer rim portions 28a and 29a, respectively, shown as substantially parallel to the rim portions 26a and 27a of the inner rings 26 and 27, and the outer rings 28 and 29 also have inner rim portions 28b and 29b respectively shown as substantially parallel to the rim-portions 26b and 27b. The ends 24b and 25b of the resilient members 24 and 25 are desirably vulcanized to the rim-portions 28b and 29b, respectively, of the supporting rings 28 and 29.

The mating surfaces for the rims 28a and 29a as shown are correspondingly tapered-rim-portions 22a and 22b of the wheel rim 22. As shown, each of the rim-portions 22a and 22b are sloped to taper inwardly of the wheel a small angle out of parallel with the wheel axis. The arrangement is such that the mating surfaces 28a—22a, and 29a—22b respectively, bear in a self-locking manner, for in response to load they produce a wedging engagement and a consequent intensification of their holding force.

Along its axially inner edge-portion, radially outer surface of the wheel hub 23 is likewise tapered, as at 23a. As seen, the taper of the hub-surface 23a is also a small angle from parallel to the wheel axis, and as shown is substantially parallel to the rim-portion 22b of the wheel rim 22. Thus the arrangement provides that mating surfaces 23a—27a likewise bear in a self-locking or wedging manner.

The correspondingly tapered surface for seating the rim-portion 26a of the axially outer supporting member 26 is shown as provided by an annular flange 30 of a clamping ring 31 adapted to be clamped as by bolts 32 to the axially outward surface of the hub 23. The rim 30 of the clamp ring 31 is tapered inwardly of the wheel a small angle from parallel to the wheel axis, to provide a wedging or self-locking co-action of mating surfaces 26a—30, similar to that described in connection with mating surfaces 28a—22a, 29a—22b, and 23a—27a, respectively, as clamp ring 31 is axially drawn toward the hub 23.

It will be observed that the supporting structure 24' illustrated in Figure 2 for supporting the axially outward portion of the wheel rim 22 and tire 21, such supporting structure comprising the supporting members 26 and 28 with the resilient ring member 24, may be and desirably is identical with the corresponding supporting structure 25' which supports the axially inward portion of the wheel rim 22 and tire 21, such inward supporting structure comprising the supporting members 27 and 29 and the resilient ring 25.

In the supporting structures 24' and 25', here shown as in the ring members 28 and 29 thereof, there are provided one or more apertures such as the holes 33. These holes 33 serve to permit the passage of air into the chamber formed between the wheel rim 22 and the wheel hub 23. It may be noted that one of the holes 33 serves to accommodate the passage through the supporting member 28 of a tire valve 34. Cooperating with the openings 33 in providing flow of cooling air are one or more apertures such as the holes 35 provided in the clamp ring 31.

Heat dissipating means such as the ribs 36 desirably extend along the outer surfaces of the wheel hub 23 for purposes for cooling, to be swept by air circulating through the chamber between wheel rim 22 and wheel hub 23.

A wheel constructed as just described is easily and readily assembled, as is indicated in the view of Figure 3 which shows such a wheel in a state of partial assembly. As indicated in Figure 3, assembly is desirably effected by sliding the axially inward supporting structure 25' relatively inwardly along the wheel hub 23, and the rim-portion 22b of the wheel rim 22 is seated on the free rim-portion 29a of the supporting ring 29. The axially outward supporting structure 24' is fitted in against the outer portion of the wheel rim 22, with the free rim-portion 28a of supporting ring 28 seated against the rim-portion 22a of the wheel rim 22. Clamping ring 31 is seated against the rim-portion 26a of the supporting ring 26.

At this stage of assembly, the clamping ring 31 is out of engagement with the outer face of the wheel hub 23 a substantial amount to provide that the resilient rings 24 and 25 must be compressed to permit the clamping ring bolts 32 to draw clamping ring 31 toward the outer surface of the wheel hub 23. Desirably, this pre-compression of the resilient rings 24 and 25, as is indicated at diagrammatically by the change in configuration between the free condition of those rings illustrated in Figure 3 and the compressed condition of those rings 24 and 25 as illustrated in Figure 2, is such that they are compressed sufficiently high, preferably between 5% and 15%, so that no tensile stresses can occur in the rings under any deformation. Thus, firm seating of the supporting rings 26, 28, 27 and 29 on the hub 23 or rim 22 is assured at all times. The compression of rings 24 and 25 provides a forced wedging holding of the rim 22 to the hub 23.

In the alternative embodiments illustrated in Figures 5 through 10, insofar as possible we have denoted features corresponding to features of the embodiment of Figures 1 through 3 and to the other embodiments by reference numerals differing by increments of one hundred.

Figure 5:
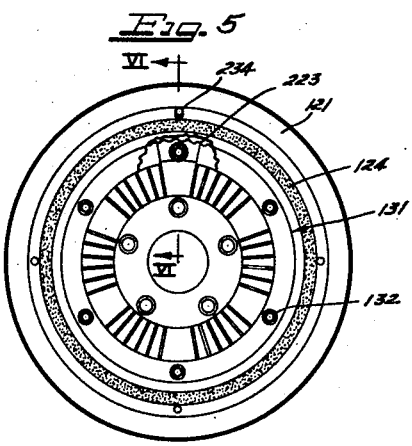
Figure 5 is a side elevational view of a wheel according to still another embodiment of our invention.
Figure 4:
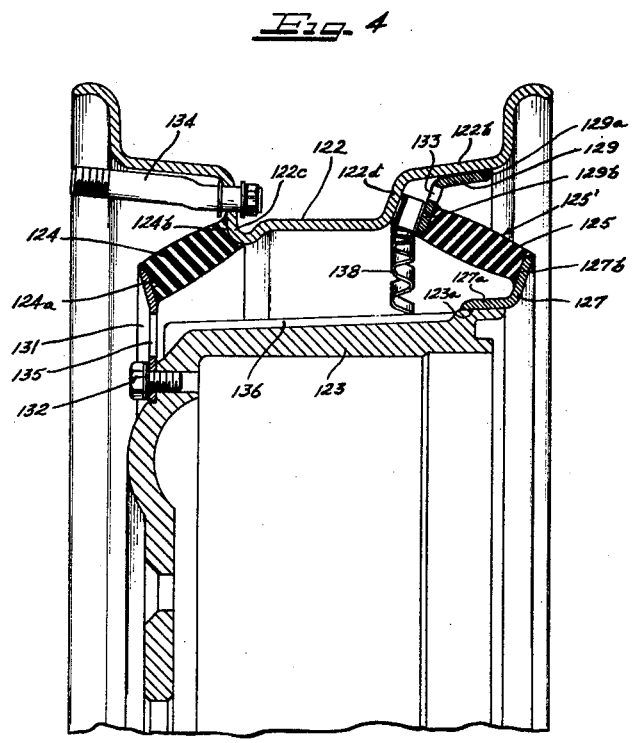
Figure 4 is an axial cross-sectional view taken through a wheel constructed according to an alternative embodiment of our invention.

In the embodiment of Figures 4 and 5, the wheel assembly accordingly comprises a wheel rim 122 and a wheel hub 123, the axially inward rim-portion 122b being resiliently carried by a resilient supporting structure 125'. The supporting structure 125' as shown comprises a resilient ring member 125 whose ends are vulcanized to rim portions 127b and 129b of radially inner and outer supporting rings 127 and 129 respectively. The free rim 127a of the ring member 127 is shown as seated on a tapered surface 123a of the wheel hub 123. The supporting ring 129 is provided with apertures 133 to permit entrance of air into the chamber between the wheel rim 122 and the wheel hub 123. To assist in cooling of the hub 123, heat-dissipating ribs 136 extend along its periphery.

As so far described, the embodiments of Figures 4 and 5 are seen to be at least substantially identical with the embodiment of Figures 1 through 3. However, as is shown in Figure 4, the supporting structure which supports the axially outward portion of the wheel rim 122 does not utilize the supporting rings 26—28 of the first-described embodiment. Instead, a resilient ring 124, which ring 124 is desirably at least substantially identical with the ring 125, 24, and 25, has its end faces 124a and 124b vulcanized respectively to the inner surface of a clamping ring 131 and to an outwardly facing flange 122c of the wheel rim 122. As shown, the rim flange 122c is desirably provided as a peripherally extending bead inwardly pressed integrally from the wheel rim 122.

Figure 4 also illustrates an alternative arrangement providing for cooling of the assembly. As there shown, between the rim-portion 129b of the outer supporting ring 129 and the adjacent rim-portion 122d of the wheel rim 122, there is provided a ventilation-promoting ribbed or corrugated member such as the lamella-like ring 138. Aperture means such as the holes 135 are shown as provided in the clamping disk 131 to promote circulation of cooling air.

Assembly of the wheel construction shown in Figures 4 and 5 is readily accomplished by first sliding the axially inward supporting structure 125' inwardly along the wheel hub 123 to the point where the rim-portion 127a of the supporting ring 127 seats on the surface 123a of the hub 123. Then the hub 123, carrying the inward structure 125', is moved relatively axially outwardly within the wheel rim 122 until the free rim-portion 129a of the outer supporting ring 129 seats against the surface 122b of the wheel rim 122. At this state of assembly, there will be a gap between the clamping ring 131 and the outer surface of the wheel hub 123, providing that when the clamping ring is drawn toward the hub 123 as by the bolts 132, the resilient ring-members 124—125 will be compressed as has been described in connection with the resilient ring-members 24 and 25.

In the modified arrangement illustrated in Figure 6, a wheel rim 222 is shown supported as by an axially inward supporting structure 225' including a resilient ring-like member 225 and inner and outer supporting rings 227 and 229, respectively, on a wheel hub 223, generally according to the embodiment shown in Figure 2. Here, however, the cooling inlet apertures 233 are shown as provided in rim-portion 227b of the radially inward supporting ring 227. The supporting structure for the axially outward portion of the wheel rim 222 is shown as including a resilient ring-like member 224 having its opposite end faces respectively seated against rim-portion 222c of wheel rim 222 and to clamping ring 231, generally corresponding to the axially outward support provided for the wheel rim 122 in Figure 4 above described.

In contrast to the embodiment in Figure 4, however, in Figure 6 the passage of coolant air admitted through the apertures 233 is between the clamping ring 231 and the side face 223b of the hub 223. Air-channeling means such as the radially extending ribs 239 shown guide the cooling air and promote the desired ventilation. Spacing means such as a boss means 223b' extends between the side face 223b of hub 223 and the clamp ring 231 to carry the clamp ring 231 spaced from the hub 223 to provide for the desired air flow between the clamp ring and hub.

Figures 7 and 8 illustrate means for resisting relative rotation of a resiliently carried wheel rim 322 and associated tire about a wheel hub 323. Thus, in the embodiment there shown, in which the supporting structure includes a resilient ring-like member 325 and inner and outer supporting rings 327 and 329, rotationally interengaging means are shown to block relative rotation of hub 323 and supporting ring 327. Such means as shown comprise abutment or projection means such as a lug 340 or the like, secured as by welding 341 to the supporting ring 327. The lug 340 is received within an associated recess 323c provided in the adjacent portion of the wheel hub 323. The walls of the recess 323c provide abutments which engage the lug 340 and prevent relative rotation of the supporting ring 327 and wheel hub 323.

In Figure 9, alternative rotation-limiting means are shown, comprising interengaging means such as an integrally offset projection or bead 440 provided by a supporting ring 427 and abutingly engaged by the walls of an associated abutment means such as the depression or recess 423c provided in the associated wheel hub 423.

Other alternative rotation-limiting means are illustrated in Figures 10 and 11. As there shown, a projection such as a finger or tab 540 or the like is integrally struck inwardly from supporting ring 527 and received between the walls of an associated recess such as a slot 523c provided in the associated wheel hub 523.

A resilient wheel assembly constructed according to the present invention may be readily assembled. It has good coolant properties and has good mechanical operability to provide the desired resiliency desired for good riding characteristics. It has good lateral stability, and accommodates high deflections and deformations under load. It resists relative rotation of the resiliently carried tire end rim assembly about the associated wheel hub.

It will thus be seen from the foregoing description of our invention according to exemplary preferred embodiments, considered in conjunction with the accompanying drawings, that the present invention provides a new and improved resilient wheel having the desired advantages and characteristics, and accomplishing its intended objects, including those hereinbefore pointed out and others which are inherent in the invention as described.

It will be understood that modifications and variations may be effected without departing from the scope of the novel concepts of the present invention.

We claim as our invention:

1. In the combination of a wheel rim assembly and its associated hub, a resilient mounting adapted to resiliently support a tire and said wheel rim assembly from said associated wheel hub, comprising two resilient supporting structure means located respectively on opposite sides of said wheel assembly for resiliently supporting said wheel rim assembly from the hub, at least one of said resilient supporting structure means comprising a radially inner ring-like supporting means having an axially inclined surface adapted to wedgingly coact with a coacting surface of said hub to resist movement of said inner ring-like means in an axial direction along said hub, a radially outer ring-like supporting means adapted to wedgingly coact with the wheel rim to resist movement of said rim in the same axial direction along said outer ring-like means, and a resilient ring-like means supported intermediate said inner and said outer supporting means, radially opposite faces of said resilient ring-like means being vulcanized to said outer and inner ring-like supporting means.

2. In the combination of a wheel rim assembly and its associated hub, a resilient mounting adapted to resiliently support a tire and said wheel rim assembly from said associated hub comprising two resilient supporting structure means located respectively on opposite sides of said wheel assembly for resiliently supporting said wheel rim assembly from the hub, at least one of said resilient supporting structure means comprising a radially inner ring-like supporting means including angularly related outer and inner rim-like portions, the inner rim-like portion having an axially inclined surface adapted to wedgingly coact with a coacting surface of the hub to resist movement of said inner ring-like means in an axial direction along said hub, a radially outer ring-like supporting means including angularly related outer and inner rim-like portions, the outer rim-like portion being adapted to wedgingly coact with the wheel rim to resist movement of said rim in the same axial direction along said outer ring-like means, and a resilient ring-like means supported intermediate and bonded to said inner and said outer supporting means.

3. In the combination of a wheel rim assembly and its associated hub, a resilient mounting adapted to resiliently support a tire and said wheel rim assembly from said associated hub, comprising a resilient supporting structure means for resiliently supporting a portion of said assembly from the hub, said resilient supporting structure means comprising a radially inner ring-like supporting means, and a radially outer ring-like supporting means, and a resilient ring-like means supported intermediate and bonded to said inner and said outer supporting means, said inner ring-like supporting means engaging said hub along a conical surface, said outer ring-like supporting means engaging said rim along a generally similar and generally concentric conical surface, and cooperating abutment means carried by said hub and said inner ring-like member to block relative axial rotation thereof.

4. In the combination of a wheel rim part and an associated hub part, a resilient mounting adapted to resiliently support said wheel rim part from said hub part, means radiating from said hub part and providing axially spaced first anchorage adjacent the rim, means on the rim part providing second anchorages each associated with a first anchorage in generally axially aligned, inwardly spaced, relationship thereto, a pair of resilient ring-like means comprising opposed elastic sleeves each extending generally axially of the wheel rim and hub part, each sleeve having an axial outer end secured to a first anchorage and an axial inner end secured to an associated second anchorage, each sleeve having a generally frusto-conical shape which provides generally straight line connections between the anchorages which will not fold while accommodating radial and circumferential displacements of the hub and rim parts, each sleeve having its intermediate portion between said anchorages unsupported, and at least one of said anchorages for one of said sleeves including a ring-like supporting means independent of said hub and rim parts to which the associated sleeve is vulcanized, there being means for holding said ring-like supporting means relative to the other anchorage for the said one sleeve in a position to stress said one sleeve, there being coacting axially inclined wedging surfaces provided between said one ring-like supporting means and its associated part in said anchorage, and the stress in said one sleeve being exerted in a direction to increase the wedging action between said coacting surfaces.

5. The combination of claim 4 wherein both of the anchorages of said one sleeve include ring-like supporting means independent of said hub and rim parts and to which said one sleeve is vulcanized and wherein coacting inclined wedging surfaces are provided between each of said ring-like supporting means and its associated part in said anchorage.

6. In the combination of a wheel rim member and an associated hub member, a resilient mounting adapted to resiliently support a tire and said wheel rim member from said associated hub member, comprising two resilient supporting structure means located respectively on opposite sides of said wheel rim member for resiliently supporting said wheel rim member assembly from the hub member, at least one of said resilient supporting structure means comprising a ring-like supporting means adapted to wedgingly coact with one of said members to resist movement of said ring-like means in one axial direction along said one member, a resilient ring-like means bonded to said supporting means and supported intermediate said supporting means and the other of said members, and means to hold said hub member and said rim member axially related to compress said resilient ring-like member, whereby said compression urges said supporting means in said one axial direction to maintain the combination.

References Cited in the file of this patent

UNITED STATES PATENTS

| | | |
|---|---|---|
| 1,247,988 | Mortier | Nov. 27, 1917 |
| 2,282,589 | Mayne | May 12, 1942 |
| 2,386,236 | Lyon | Oct. 9, 1945 |
| 2,798,525 | Mantzel | July 9, 1957 |
| 2,800,357 | Boschi | July 23, 1957 |

FOREIGN PATENTS

| | | |
|---|---|---|
| 1,010,066 | France | Mar. 12, 1952 |
| 1,053,995 | France | Oct. 7, 1953 |

(Corresponding Great Britain Patent 723,975 Feb. 16, 1955)